Feb. 22, 1927.                J. R. GRUETTER                1,618,821
                               BOTTLE HOLDER
                           Filed March 29, 1922
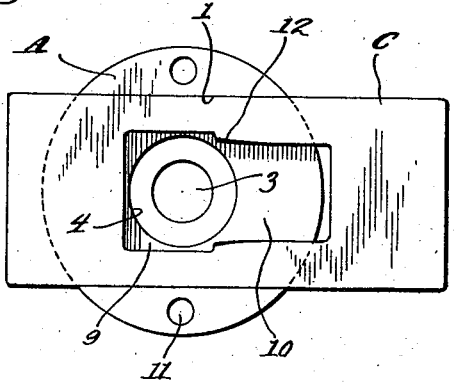
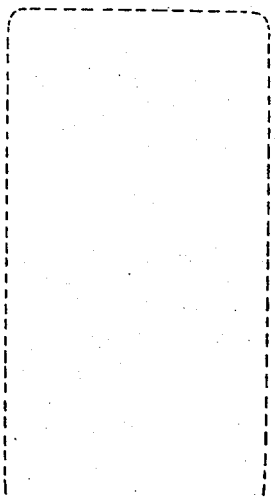
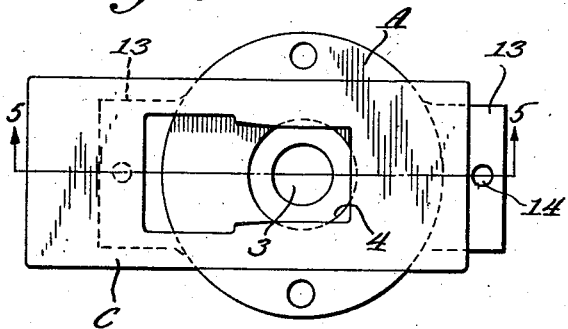
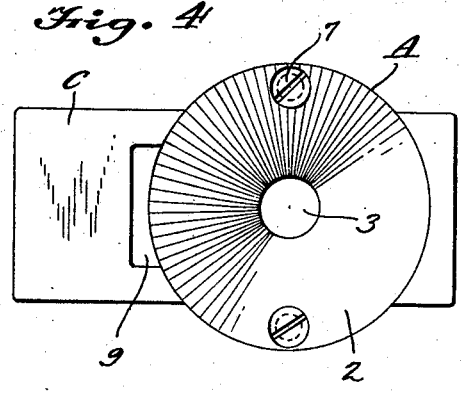
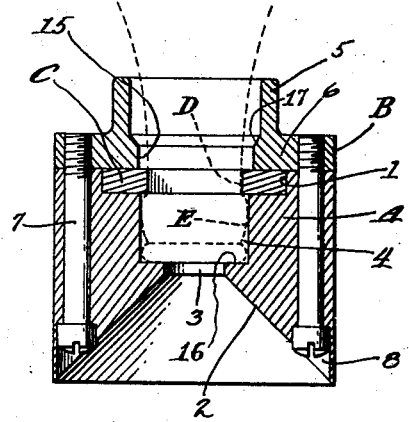
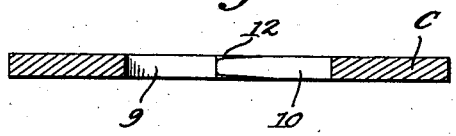
Inventor
John R. Gruetter
By Gray and Lilly
Att'ys Patented Feb. 22, 1927.

1,618,821

UNITED STATES PATENT OFFICE.

JOHN R. GRUETTER, OF CLEVELAND, OHIO.

BOTTLE HOLDER.

Application filed March 29, 1922. Serial No. 547,943.

This invention relates to improvements in chucks or bottle holders which are employed to secure bottles on a carrier, as when they are in process of being cleansed. It is quite conventional to provide an endless carrier formed of links for moving the bottles over a cleansing mechanism, the bottles being released from the carrier at one end of the machine after the cleansing operation is finished. For accomplishing this function it is designed to mount holders or chucks on the links of these chains or carriers which chucks receive the necks of the bottles and hold the latter inverted when they are carried on the upper course and suspended therefrom on the lower course of their travel. It is my purpose to provide a new and improved holder or chuck for this purpose which shall embody therein a positive means for locking the bottle in the chuck during the major part of travel of the bottle and shall unlock or release the bottle when it nears the point of discharge from the machine.

It is a further object of the said invention to provide a holder which shall be simple and automatic in operation as well as positive and certain in its locking and releasing functions.

With the above and other objects in view the invention consists in the chuck for securing bottles therein as herein claimed and described in the specification.

Referring to the accompanying drawings in which like characters of reference indicate the same parts in the several views:

Figure 1 is a central vertical section view of the chuck as an entirety, a bottle being shown in dotted lines in position therein;

Figures 2 and 3, are plan views of the base and plate members only. Figure 2, showing the plate in released position and Figure 3, in locked position.

Figure 4, is a bottom plan view of the device, and

Figure 5, is a section of the sliding plate, the same being taken on the line 5—5 of Figure 3.

The bottle holder which forms the subject of my invention comprises three parts, a base A, a cover part B coextensive with the base, and a sliding, locking plate C, for securing the bottles in the holder. All of these parts have registering openings for receiving the bottle necks, these openings being of the size fitting the tpye of bottle to be treated. The same relative shape of chuck can be used, and is intended to be used, with small or large necked bottles; and while I have shown this chuck as adapted to receive small necked bottles such as beer bottles, I am by no means to be restricted to chucks having openings designed to receive bottles of this type, but I am to be understood as disclosing chucks having registering apertures for receiving all kinds of bottles which have an enlarged or bulging rim E, and a reduced or slender neck portion D, the latter portion fitting closely within the narrower slot 10, while the portion E, fits closely within the larger slot 9, of said plate.

Both the base and cover portions of the chuck are shown in the drawings as circular in cross section, although almost any other outline will serve as well, the base portion having a cone-shaped opening 2, terminating at the apex in a cylindrical opening 3, though in many cases it may be desirable to make the opening 2, of some other shape as for example cylindrical, leading directly to the opening 3. The latter leads upward to a larger cylindrical opening 4, in axial alinement with the opening 3, thereby providing a shoulder or seat 16, for limiting the further insertion of the bottle neck. In the upper face of the base A, is a cut-out groove 1, of the proper shape and size to receive therein the rectangular plate C, flush with the surface of the base.

The plate C, has a longitudinally-arranged slot the larger portion 9, of which is at least as large in width as the diameter of the opening 4, and the enlarged neck portion E, as above explained. The slot 10 which is too narrow to permit the enlargement E. of the bottle neck, has its walls reduced at 12 in thickness so as to easily force the narrower slot around the reduced portion D, of the bottle and gradually engage the said enlargement as the plate is moved into locking engagement. This therefore provides a wedging action which is very desirable.

The cover comprises a flat plate 6, having a central opening 15. and threaded apertures in alinement with the bolt holes 11 of the base, and an annular flange part 5, having an enlarged opening in axial alinement with the opening 15.

The herein described chuck is designed to be mounted upon a traveling carrier, such as a metal chain, when it is so desired; and for this purpose the base A, is provided with lateral ears and lugs 13, for attachment to the parts of the chain links or other suitable elements of the traveling carrier. These lugs are provided with holes 14, for receiving bolts or screws, for such attachment. This disclosure of the attaching lugs is shown in Figure 3, to illustrate the manner of mounting the chuck on the carrier when bottles are to be so supported, though this invention is not particularly concerned with the mounting mechanism therefor. For the latter reason, the said lugs are not shown in Figures 2, and 4, of the drawings.

In operation, the parts are assembled by inserting the bolts 7, in the holes 11 in the base and screwing them into the threaded holes in the cover section B, the walls of the base A, being cut out at 8, to sink the heads of the said bolts below the inner surface of the conical opening 2, as shown in Figure 1. The plate C, is then inserted in the groove 1, and the device is ready for mounting in the relation desired. The said plate C, is positioned in groove 1 for transverse movement at an angle to the movement of the advance of the bottles, and is of such length that its ends project beyond the side of the chuck, and the plate is designed to be actuated ordinarily by stationary cam rails (not shown) on either side of the traveling chuck, the rails being so mounted that in the course of its travel relative to the same, the locking plate will be moved in a direction transverse of its path of travel over in the position shown in Figure 2, at the point where the bottles are to be fed into the holder, then the rails are so positioned as to slide the plate C by a cam action, into the relation shown in Figure 3, to lock the bottle therein until the latter arrives at the releasing station when they will unlock said bottle for disengagement therefrom. Since no claim is made in this case to the actuating element, no further description of machine parts with which the holder may be operatively associated is thought necessary.

It is well however to note that the inner surface of the opening in the cover B, is tapered for easily and conveniently guiding the bottle neck down into the opening 4, in the base A; and for this purpose the opening in the flange 5, is beveled at 17, between the upper larger opening and the lower reduced portion 15, and also, for the same reason, the latter opening is slightly larger than the said opening 4, in the base A.

The function of the conical opening 2, in the base will be quite evident, as the upwardly-directed stream of cleansing liquids, gases or both usually employed will, by such shaped opening, reach the inner surface of the bottles to be cleansed with great accuracy and certainty. In some cases, however as in treating the large-neck bottles as milk bottles, little advantages is gained from the conical opening, and it is to be noted that my locking structure is equally effective whether used with chucks of one form of lower opening or another.

The great function to be attained by my holder cannot fail to be appreciated by those skilled in the art to which it appertains. In the search for automatic operation of washing apparatus for receptacles, especially those of glass, it has always been a problem how to positively secure the bottles on the carrier, especially when the bottles are suspended from the lower rim of the carrier, during the cleansing operation, without requiring the attention of attendants for latching and releasing the bottles from the holder and without increasing breakage of the product. This I believe is accomplished by this construction.

From the construction above disclosed, it will be seen that there is provided no resistance to the free insertion of the bottle neck into the holder, as would be the case where spring-pressed or otherwise yieldable elements were used to secure the bottles in position, but that in my structure when the locking plate is in the open position, there is a free and open passage for the entrance of the bottle neck with no resistance whatever to its insertion to the lower seat at 16; and that, when the plate is unlocked, there is no resistance whatever to the release of the bottle therefrom. There is therefore eliminated the "catching" or sticking of the bottle in the chuck or holder when the discharge point in the machine is reached which condition has given rise to great inconvenience and waste in spring-held constructions in the past.

While my holder is disclosed as a single unit in the drawings, it is to be expressly understood that I by no means limit myself to the unit structure in operation. It will be easily understood that a plurality of such chucks may be operated side by side, and that such rows may be mounted on a common carrier mechanism, and I contemplate such use of this device.

It is apparent that changes in the construction and arrangement of parts may be resorted to without departing from the spirit of my invention or sacrificing any of the advantages thereof.

Having thus described my invention, what I claim is,—

1. A bottle holder having at one end, a socket for receiving therein the neck of a bottle and a locking plate slidable transversely to intersect the socket, said plate having therein an elongated slot parallel to the length of the plate, said slot comprising narrow and broad portions, the narrow portion being narrower and the broader portion wider than the enlargement at the end of the bottle neck.

2. A bottle holder having at one end a socket for receiving the neck of a bottle, there being an opening at the other end in alinement with the socket and a transversely slidable locking plate movable to intersect the socket and having a longitudinal slot therein of different widths, whose smaller portion is narrower and the larger portion wider than the enlargement at the end of the bottle neck, substantially as set forth.

3. A bottle holder having at one end a socket portion for receiving the neck of a bottle therein and an annular, tapering flange portion having its central opening in axial alinement with but larger than the said socket, a transversely slidable member movable across and intersecting the said socket and having means for locking the bottle neck in the socket portion when in one extreme position of its movement, and for releasing the same when in the opposite position, substantially as set forth.

4. A bottle holder comprising a chuck having an axial opening therethrough, said opening including a tapering portion at one end adapted to receive the neck of a bottle, said tapering portion terminating in a reduced socket portion within the chuck, a transversely slidable plate movable in a slot in the chuck across the said socket portion and having a longitudinal slot of different widths therein one portion of which is narrower and the other portion wider than the enlargement at the end of the bottle neck, substantially as set forth.

5. A bottle holder comprising a base member having an axial opening therethrough one end of which is cone-shaped for directing a stream of liquid therein and the other end adapted to receive the neck of a bottle, a transversely slidable plate and a flanged cover member circular in outline and of a size to fit the said base part, the body of the cover and its flange having openings larger than but registering with the base opening, the said base member having a slot rectangular in cross section flush with its top surface for seating the said plate for movement therein, and means for detachably securing the base and cover parts together with the plate therebetween, substantially as set forth.

6. Mechanism for holding bottles on a carrier comprising a cylindrical chuck having an axial opening therethrough of varying size, the lower portion being conical in shape terminating at its apex in a small cylinder above which is a larger cylindrical opening to provide a shoulder or seat for the end of the bottle neck, the portion thereabove being enlarged laterally to provide a transverse seat for a sliding member, and the upper portions being successively enlarged to direct the bottle neck easily into its seat, an elongated plate sliding in said transverse seat and having a longitudinal slot of varying width the wider part being larger than the enlargement on the bottle neck and the narrow part being smaller than the said enlargement, and lugs extending laterally from said chuck for attachment to a support, substantially as set forth.

7. A bottle holder having a socket therethrough for receiving a bottle neck having an enlarged protuberance at its end, comprising a base part having at one end a transverse cut-out portion serving as a seat for a sliding member and intersecting the main socket, the latter having a cylindrical portion below the said cut-out portion of a size to receive said enlarged protuberance, a lower reduced portion smaller than said protuberance providing a seat for said protuberance thereon, said base part having a flared opening communicating with the said reduced portion, a cover portion having a circular opening therein registering with said cylindrical portion in the base part, a plate slidable in said cut-out portion and having a longitudinal slot varying in width whose larger portion is wider and smaller portion narrower than the said protuberance, and means for detachably securing the said base and cover parts together with the said plate therebetween, substantially as set forth.

8. A bottle holder comprising a socketed base member having at one end a transverse cut out portion intersecting the main socket and a cover member, screw means for detachably securing said members together with the said cut out portion therebetween, and an elongated locking member slidable in the direction of its length but transversely of the holder for locking a bottle thereto in one position and unlocking the same in another position of its movement, substantially as set forth.

9. A bottle holder comprising a base member and a cover member having an axial opening therethrough, one portion of which provides a tapering socket for receiving therein a bottle neck having an enlargement thereon, a transversely movable locking plate having a longitudinal slot therethrough comprising a larger portion as wide as the said enlargement and a smaller portion narrower than the enlargement but as wide as the remainder of the neck and the walls of said smaller portion having reduced thinner wedging parts at the entrance thereto from the wider portion of the slot, and means for detachably securing the cover and base members together with the said plate seated therebetween, substantially as set forth.

10. A bottle holder having at one end a socket for receiving the neck of a bottle and a transversely slidable locking plate, movable to intersect the socket and having a longitudinal slot therein, of different widths whose smaller portion is narrower than the enlargement at the end of the bottle neck and the inner edges of said smaller portion having reduced thinner wedging parts at the entrance thereto from the wider portion of the slot.

11. A bottle holder having at one end a socket for receiving the neck of a bottle and a transversely slidable locking plate movable to intersect the socket and having means thereon for engaging the enlargement on the bottle neck, said means including a flat portion of the plate and having a variable thickness graduating from a thinner edge for releasing the bottle neck from the plate, to a thicker edge for positively engaging the said neck by a wedging action.

12. A bottle holder having a socket portion for receiving the neck of a bottle therein and a transversely slidable locking plate movable to intersect the socket and having portions thereof of variable thickness for engaging the enlargement on the bottle neck for locking the bottle neck in position in the socket by a wedging action.

In testimony whereof I hereunto affix my signature.

JOHN R. GRUETTER.